United States Patent
Isnardi et al.

(10) Patent No.: US 6,400,400 B1
(45) Date of Patent: Jun. 4, 2002

(54) METHOD AND APPARATUS FOR AUTOMATED TESTING OF A VIDEO DECODER

(75) Inventors: Michael Anthony Isnardi, Plainsboro; Charles Benjamin Dieterich, Kingston; Hans Andreas Baumgartner, Hamilton, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 08/902,965

(22) Filed: Jul. 30, 1997

(51) Int. Cl.⁷ .................. H04N 17/00; H04N 17/02
(52) U.S. Cl. ............. 348/180; 348/184; 348/189; 348/192; 348/193; 382/233; 341/67
(58) Field of Search ................ 348/180, 184, 348/189, 192, 193; 382/233; 341/67

(56) References Cited

U.S. PATENT DOCUMENTS

| | | | | |
|---|---|---|---|---|
| 5,313,280 A | * | 5/1994 | Straus | 348/181 |
| 5,574,500 A | * | 11/1996 | Hamada et al. | 348/180 |
| 5,706,002 A | * | 1/1998 | Meehan et al. | 341/67 |
| 5,731,839 A | * | 3/1998 | Panaro | 348/416 |
| 5,748,229 A | * | 5/1998 | Stoker | 348/180 |
| 5,764,284 A | * | 6/1998 | Stoker | 348/181 |
| 5,798,788 A | * | 8/1998 | Meehan et al. | 348/180 |
| 5,818,520 A | * | 10/1998 | Jenko et al. | 348/192 |
| 5,926,226 A | * | 7/1999 | Proctor et al. | 348/422 |
| 5,983,022 A | * | 11/1999 | Watkins et al. | 395/708 |
| 6,011,868 A | * | 1/2000 | Van Den Branden et al. | 382/233 |
| 6,044,397 A | * | 3/2000 | Eleftheriadis et al. | 709/217 |
| 6,057,882 A | * | 5/2000 | Van Den Branden Lambrecht et al. | 348/192 |
| 6,230,295 B1 | * | 5/2001 | Watkins | 714/742 |

* cited by examiner

Primary Examiner—John W. Miller
Assistant Examiner—Paulos Natnael
(74) Attorney, Agent, or Firm—William J. Burke

(57) ABSTRACT

An apparatus and concomitant method for creating and applying an encoded bitstream to evaluate the performance of a black box video decoder. The encoded bitstreams are designed such that the results from the DUT can be evaluated without the need of a human observer. The method applies the encoded bitstream to both a DUT and a compliant reference decoder and compares the results from both decoders to determine compliance of the DUT. Additional embodiments address postprocessing and the selection of a subset of test frames for evaluation.

18 Claims, 5 Drawing Sheets

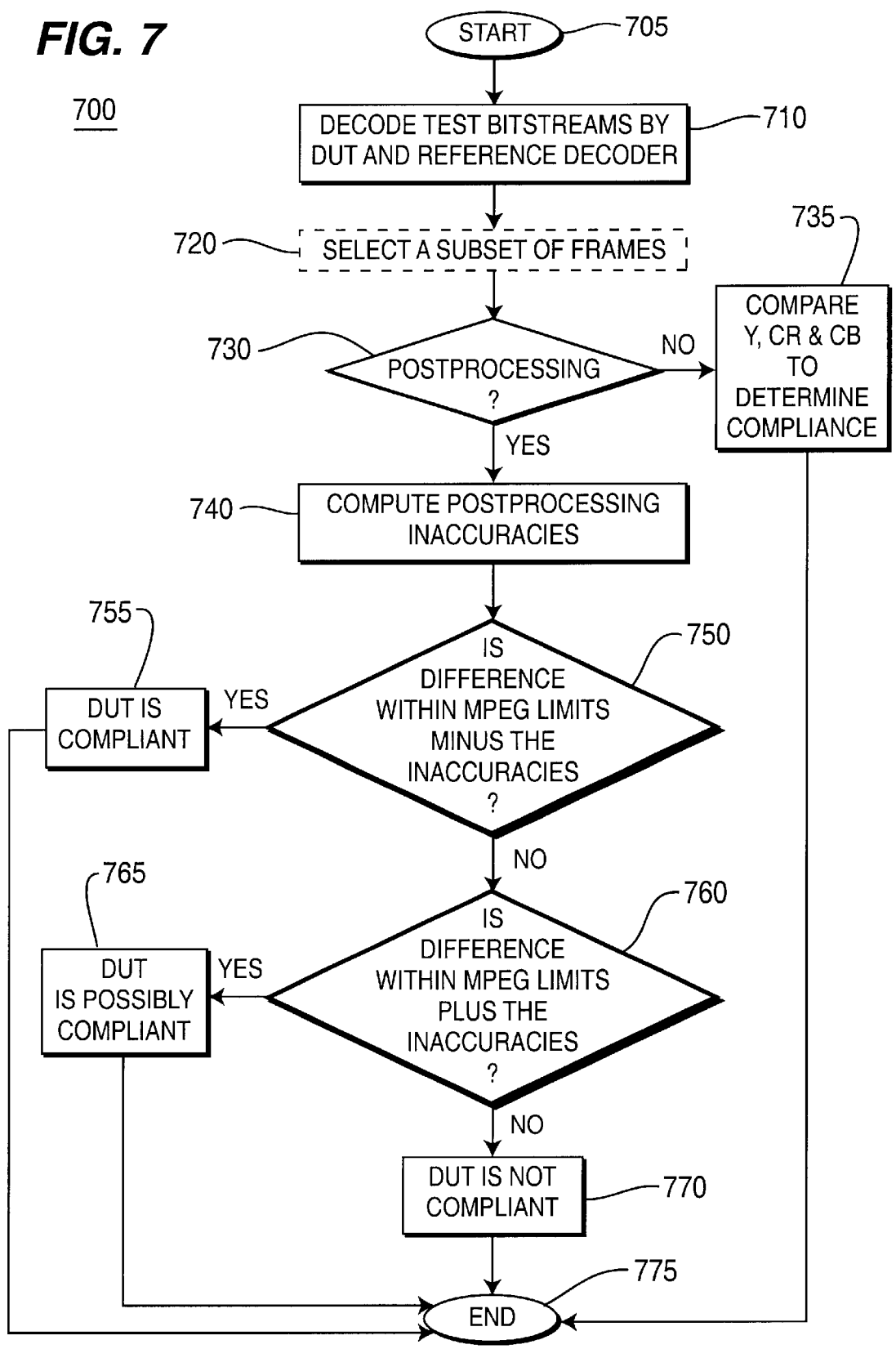

METHOD AND APPARATUS FOR AUTOMATED TESTING OF A VIDEO DECODER

The present invention relates to a method and apparatus for evaluating the decoding of video signals by a "black box" video decoder. More particularly, this invention relates to an automated method and apparatus that evaluates the functionality of a "black box" video decoder without the need of a human observer to judge the quality of the decoded video signals.

BACKGROUND OF THE DISCLOSURE

The increasing development of digital video/audio technology presents an ever increasing problem of resolving the inter-operability of equipment of different manufacturers. Although various organizations, such as the Moving Picture Experts Group (MPEG), created various ISO/IEC international Standards, e.g., 11172 and 13818 (generally referred to as MPEG-1 and MPEG-2), to establish a standard coding/decoding strategy, these MPEG standards only specify a general coding methodology and syntax for generating an MPEG compliant bitstream. Thus, many variations are permitted to accommodate different applications and services. This flexibility creates product differentiation in the marketplace, where it is difficult to ascertain the compliance and quality of an alleged compliant device, e.g., MPEG-like decoders.

Unlike analog television systems, digital decoders are highly non-linear and often contain memory. A digital decoder may operate normally over a certain range of a certain parameter, but may fail dramatically for certain other values of that parameter. Furthermore, a digital decoder may depend on previously decoded data for proper behavior.

Typically, the testing of complex digital systems such as decoders is performed by stimulating the decoder under test (DUT) with a known sequence of data, and then analyzing the output data sequences or the intermediate data sequences using, e.g., a logic analyzer, to determine if the results conform to expectations. Although this is an effective testing technique, it requires extensive knowledge of the circuit implementation or observation of internal nodes of the particular decoder. In fact, a human observer is typically needed to evaluate the output from the decoder under test to determine its compliance.

However, in many instances the decoder is a "black-box" that accepts a bitstream (encoded signal) as input and provides a digital or analog representation of the decoded signal as an output. Due to product differentiation in the marketplace, it may not be possible to acquire such technical information for all decoders. In fact, even if such technical information is available, it may not be cost effective to construct a different test sequence for every decoder.

Therefore, a need exists in the art for a method and apparatus for testing MPEG-like decoders without prior knowledge of the particular circuit implementation of any particular decoder. More specifically, a need exists for an automated method and apparatus that evaluates the functionality of a "black box" video decoder without the need of a human observer to judge the quality of the decoded video signals, e.g., whether a DUT is in compliance with a particular standard.

SUMMARY OF THE INVENTION

The present invention is a method and apparatus for creating and applying an encoded bitstream that represents one or more test frames, to evaluate the performance of a black box video decoder. More specifically, the encoded bitstreams are designed such that the results from the DUT can be evaluated without the need of a human observer. The present method applies the encoded bitstream to both a DUT and a compliant reference decoder and compares the results from both decoders to determine compliance of the DUT. The present automated method evaluates the differences of the decoded luminance and chrominance signals between the DUT and the reference decoder on a frame by frame basis, which may include one or more levels of analysis, e.g., pixel by pixel, block by block, macroblock by macroblock or etc.

Furthermore, the present encoded bitstream is designed to effect easy frame and/or pixel synchronization of the DUT and the reference decoder. Namely, the synchronization ensures that a comparison is performed on the same frame at the same horizontal and vertical position. This synchronization is achieved through the use of "key blocks", which are blocks having a specific image pattern.

In one embodiment, the encoded bitstream is designed such that only a subset of the frames within the encoded bitstream is actually compared, thereby increasing efficiency and speed of the test and reducing the storage requirement necessary to store a large quantity of video frames.

BRIEF DESCRIPTION OF THE DRAWINGS

The teachings of the present invention can be readily understood by considering the following detailed description in conjunction with the accompanying drawings, in which:

FIG. 7 depicts a flowchart of the compliance testing method of the present invention.

To facilitate understanding, identical reference numerals have been used, where possible, to designate identical elements that are common to the figures.

DETAILED DESCRIPTION

Figure 1:
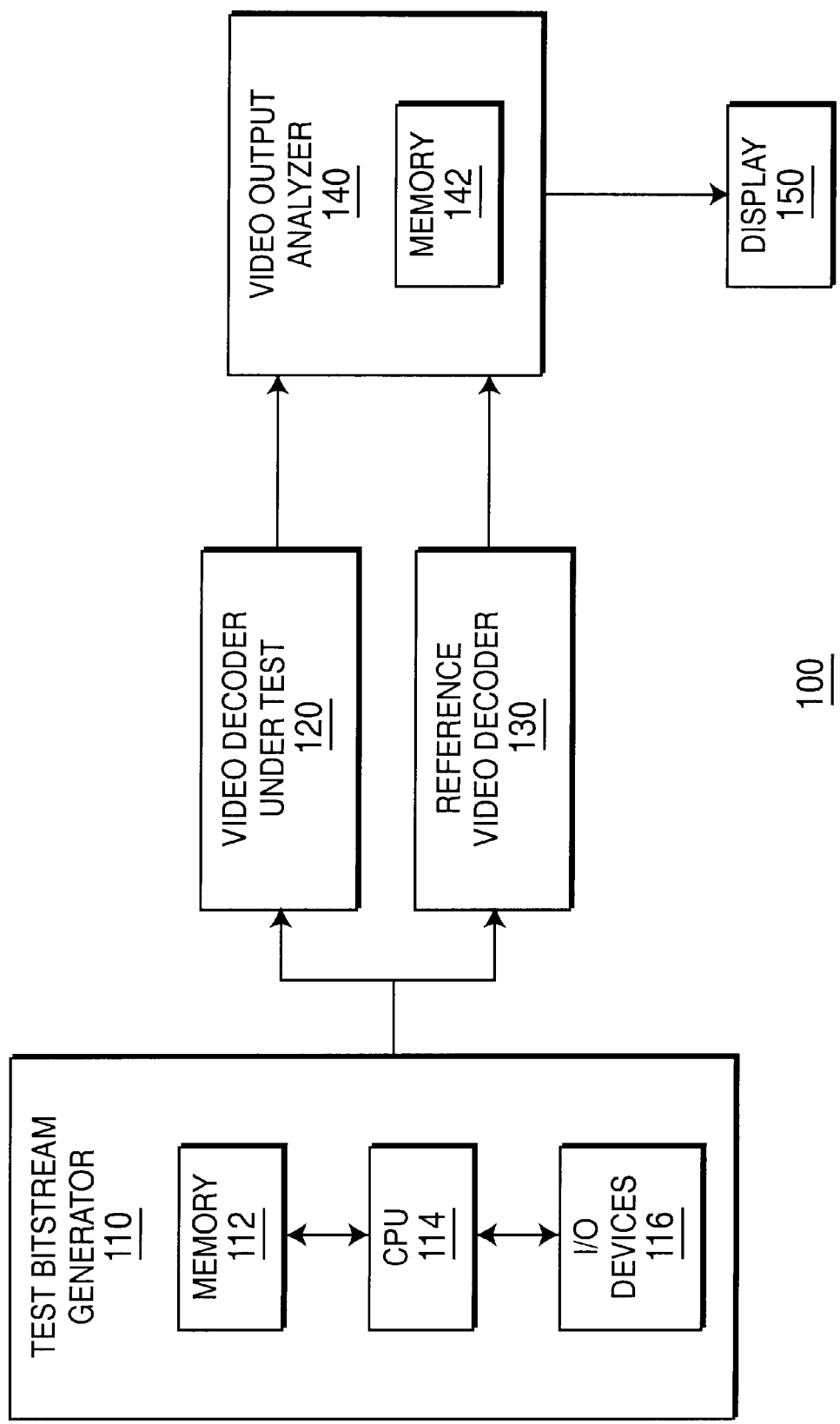
FIG. 1 depicts a block diagram of a test apparatus of the present invention.

FIG. 1 illustrates a block diagram of a test apparatus 100 of the present invention. The test apparatus comprises a test bitstream generator 110, a video decoder under test 120, a reference video decoder 130, a video output analyzer 140 and a display 150.

In the preferred embodiment, the test bitstream generator 110 comprises a general purpose computer (or application specific integrated circuits (ASIC)) having a central processing unit (CPU) 114, a memory 112 and a plurality of Input/Output (I/O) devices 116. The test bitstream generator 110 generates a plurality of encoded video bitstreams that are applied to both the video decoder under test 120 and the reference video decoder 130. The encoded video bitstream can be stored in the memory 112 or other storage devices (I/O devices). The I/O devices may include, but are not limited to, a keyboard, a mouse, a camera, a camcorder, a video monitor or storage devices, e.g., a hard disk drive, a floppy drive or a compact disk drive. The input devices serve to provide inputs to the test bitstream generator for producing the encoded video bitstreams or to allow the test bitstream generator to retrieve the encoded video bitstreams from a storage device.

The video output analyzer 140 receives the decoded video output signals from both the video decoder under test 120 and the reference video decoder 130. By comparing and analyzing these two output video signals, the video output analyzer 140 is able to determine whether the DUT is in compliance with a specific standard, e.g., the MPEG or Advanced Television Systems Committee (ATSC) standards. The encoded bitstreams of the present invention are designed to produce video output signals that are used by the video output analyzer to determine compliance of the DUT, thereby eliminating the necessity of a human evaluator. Namely, the present invention does not require a human to look at the decoded test frames, and to judge (or to detect specially designed patterns) whether the displayed video frames from the DUT are compliant to a standard. In turn, the results from the video output analyzer 140 can be displayed on a monitor or display 150.

The DUT 120 can be a physical video decoder device which is coupled to the test bitstream generator 110 through a communication system such as a transmission channel. Alternatively, the DUT can be represented by as the latest version of the software video decoder, "mpeg2decode". This video decoder was created by the MPEG Committee and is generally available on the Internet at "www.mpeg.org". Since the encoded input test bitstreams and the reference video decoder 130 are generally available beforehand, the decoded frames (Y[i,j;k]), Cr[i,j;k] and Cb[i,j;k]) from the reference video decoder 130 via path 209 are optionally decoded in advance and are stored in a storage device (reference source), such as the memory 112 or 142. Storing the output video signals from the reference video decoder 130 prior to performing a compliance test on a DUT, increases efficiency and reduces computational overhead, which is especially important in "real time" application.

The decoded frames from both decoders 120 and 130 are received by the video output analyzer 140, where on a frame-by-frame basis, the Y, Cr and Cb matrices are differenced (e.g., pixel-by-pixel), and the magnitude of the error is computed via a Y compare section 220, Cr compare section 222 and Cb compare section 224 respectively.

It should be noted that slight round-off differences are found in the implementations of the Inverse Discrete Cosine Transform (IDCT) in different decoders, such that the pixel values may differ slightly, yet the DUT may still be compliant. According to clause 3.3 in the "IEEE Standard Specifications for the Implementation of 8×8 Inverse Discrete Cosine Transform" (IEEE std 1180-1990), for any pixel location, "the peak error (ppe) shall not exceed 1 in magnitude." The MPEG-2 standard cites this document in Annex A. The value "1" is in units of brightness defined by the MPEG standards, e.g., where the color "white" has the value 240 and the color "black" has the value 16. Thus, the Y, Cr and Cb compare sections perform this absolute error function and permit the video output analyzer 140 to determine compliance in an objective manner without the need of a human evaluator.

The selection of a particular peak error threshold is often associated with a particular standard in which a DUT is being evaluated. However, a different peak error threshold can be selected for other reasons, e.g., to provide a slight tolerance in testing. Thus, it should be understood that the peak error threshold can be adapted for different applications. a software implementation (application) residing in the memory 112 of the test bitstream generator.

Similarly, the reference video decoder 130 and the video output analyzer 140 can be physical devices, e.g., using general purpose processors with memory 142 or custom ASICs. However, both the reference video decoder 130 and the video output analyzer 140 can also be represented by software applications residing in the memory 112 of the test bitstream generator.

Figure 2:
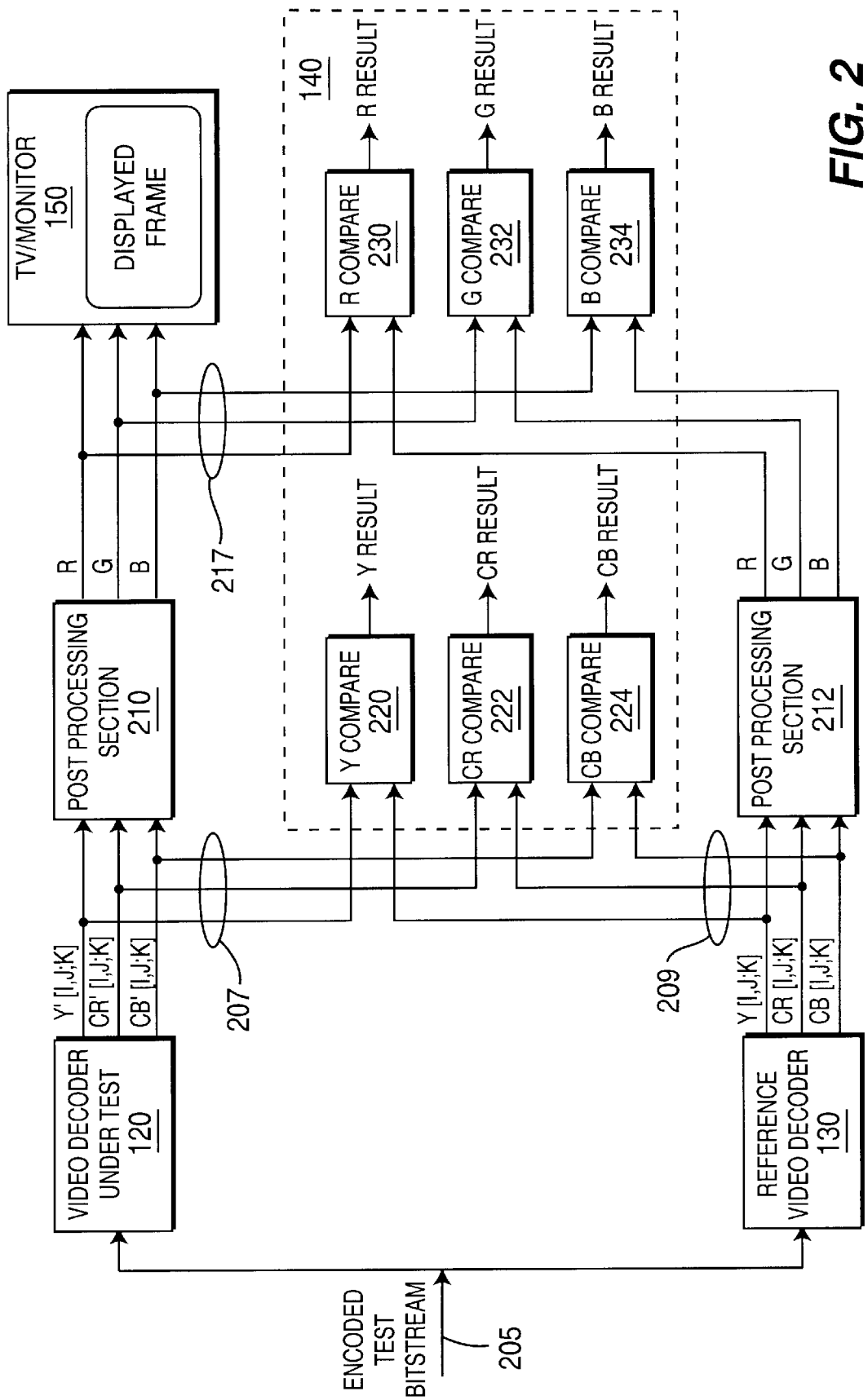
FIG. 2 depicts a detailed block diagram of the video output analyzer and its relationship with the DUT and the reference video decoder.

FIG. 2 illustrates a more detailed block diagram of the video output analyzer 140 and its relationship with the output signals from the two decoders. More importantly, FIG. 2 also illustrates the alternative embodiment where it may not be possible to directly access the decoded test frames from the DUT. In some situations, the output signals from the DUT may represent video signals that have undergone one or more postprocessing steps, e.g., frame rate variation due to 3:2 pulldown, pan-and-scan and other display functions. Since these display functions are not restricted by the MPEG standards, they are not required for compliance. These additional layers of postprocessing steps increase the difficulty of ascertaining the compliance of a particular DUT. A novel method to address this criticality is provided below.

Furthermore, although the present invention is described below with reference to the MPEG standards, it should be understood that the present invention can be applied to other MPEG-based standards, including but not limited to, ATSC, DVD, and DVB or similar standards such as MPEG-4, H.261 and H.263.

Returning to FIG. 2, a basic set up for testing compliance of MPEG-like decoders is illustrated. A specially constructed encoded input test bitstream enters the DUT 120 via path 205, and, if possible, all decoded output frames from the DUT are captured via path 207. The DUT produces one luminance signal (Y'[i,j;k]) and two chrominance signals (Cr'[i,j;k] and Cb'[i,j;k]), where i and j are the horizontal and vertical pixel indices within a frame and k is the frame index.

The input test bitstream is also received and decoded by the reference video decoder 130 which is known to be MPEG compliant, such Returning to FIG. 2, a postprocessing section (postprocessor) 210 is typically incorporated in a commercially available MPEG decoder system. The postprocessor may, for example, upsample chroma to have the same horizontal and vertical size as luma and convert from Y, Cr, Cb to the Red, Green, Blue (R, G, B) color coordinate system for display purposes. The postprocessor may also perform 3:2 pulldown, pan-and-scan and other functions. As discussed above, since these display functions are not restricted by the MPEG specification, they are not required for compliance.

In a second embodiment of the present invention, compliance of a DUT is determined by evaluating the output of the postprocessing section 210 (or otherwise known as display processing section). This second embodiment is necessitated by the fact that it may not be possible to capture the output signals from the DUT on path 207, as illustrated in FIG. 2. For some DUTs, data can only be obtained after decoder postprocessing via path 217. Such postprocessing may include re-scaling, re-rastering, shifting and repeating pictures from the DUT, thereby significantly increasing the difficulty of ascertaining the compliance of the DUT.

For example, postprocessing may introduce a number of different problems when comparing a decoded frame from the DUT 120 with a decoded frame from the reference decoder 130. First, due to the unknown decoding delay of the DUT, the video output analyzer 140 must ensure that the comparison is temporally performed on the correct frames. Second, the proper location (vertically and horizontally) of the first pixel must be determined due to cropping operations, e.g., which line is the top line and which pixel is the first pixel of the line. Third, the proper frame size (vertical size and horizontal size) must be determined due to interpolation operations. Namely, the video output analyzer 140 must determine the number of display pixels per decoded pixel, horizontally and vertically. Fourth, the proper scaling must be determined, e.g., what numerical value corresponds to black, white, and colors after the postprocessing operations. These are only some examples of the problems that are introduced by the various postprocessing operations. However, the encoded test bitstreams of the present invention are especially designed to address these postprocessing problems, and to provide the ability to determine the compliance of a DUT.

The proof of compliance involves comparing the output signal of the DUT 120 with the reference video decoder 130 having an equivalent post-processing section 212. If the methods of the postprocessing section 210 known and available, then the present invention will simply apply the same postprocessing to the output signals from the reference video decoder 130. In turn, the postprocessed frames from both postprocessing sections 210 and 212 are received by the video output analyzer 140, where on a pixel-by-pixel and frame-by-frame basis, the R, G and B matrices are differenced, and the magnitude of the error is computed via a R compare section 230, G compare section 232 and B compare section 234, respectively.

However, such information may not be available and the encoded test bitstreams must be designed to assist the video output analyzer 140 in ascertaining the functions of the postprocessing section 210. Namely, by analyzing the output signal from the postprocessing section 210, the video output analyzer 140 should be able to calibrate for brightness, contrast, and pixel location.

Figure 3:
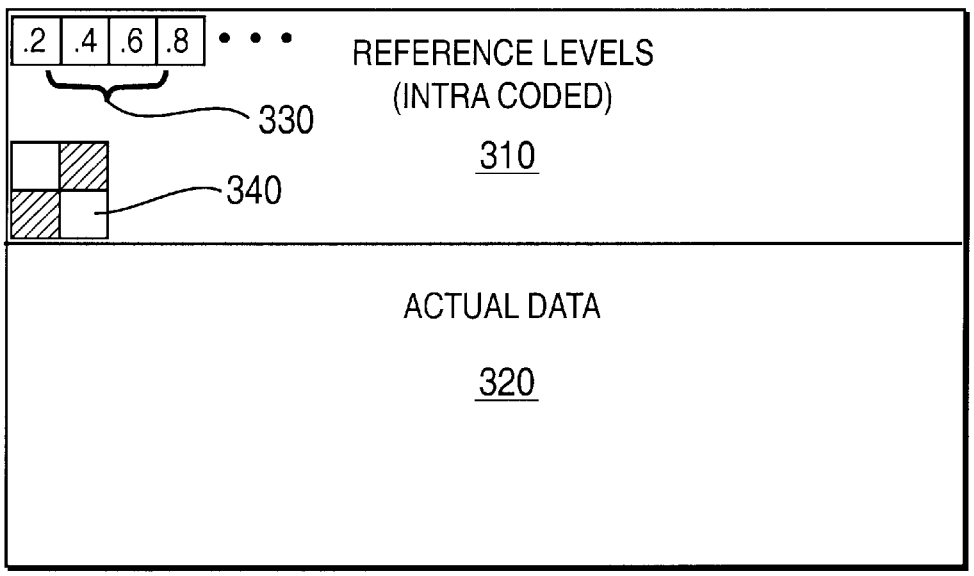
FIG. 3 depicts a test frame having an intra coded area and an actual test data area.

More specifically, "intra-coded areas" are inserted into one or more frames (e.g., a final reference frame at the end of a group of pictures (GOP)), in the test bitstreams which show the scale and brightness (and/or color) range. For example, FIG. 3 illustrates a test frame 300 having at least one intra coded area 310 and an actual test data area 320 (multiple intra coded areas can be applied, e.g., a second intra coded area can be applied below the actual data area). The intra coded area 310 is constructed with known reference levels 330 (e.g., absolute or difference levels) with scale of brightness and color of known values. These reference levels are, in turn, encoded/decoded using discrete cosine transform (DCT)/inverse discrete cosine transform (IDCT) to produce brightness and color values. Since both the intra coded area and the actual test data undergo the same encoding/decoding and postprocessing processes, it is possible for the video output analyzer 140 to assess the luminance and color scale of the actual test data by using the reference levels in the intra coded area as a template or look-up table. Once the luminance and color scale of the actual test data is assessed, it is then possible to determine whether any excursion is greater than what would have been a magnitude of 1 as specified in the MPEG standards.

The above intra coded areas may further incorporate a sequence of a black macroblock, a white macroblock each with zero (no color) values for Cr and Cb, a macroblock with a particular value of Cr and zero value of Cb, and a macroblock with a zero value of Cr and a particular value of Cb at the end of each row. The video output analyzer can use this sequence to measure the luma scale (number of steps between white and black and the value of black) as well as the chroma scales. To illustrate, luminance scale can be calculated by taking the difference of received luminance values from the black and white macroblocks, and normalizing the output scale to the encoded scale difference (e.g., 240-16). Similarly, the white chrominance scales can be determined by normalizing the chroma outputs during the Cr (or Cb) macroblock and the white or black macroblock.

The mapping (frame sizing) of the pixels is addressed by detecting the number of pixels between two predefined reference pixels, e.g., the first white pixel in each of the two white macroblocks, and dividing by the expected scale. This provides the scale for re-rastering the decoded test frame(s).

For example, if two reference pixels (or macroblocks) are placed 300 pixels apart in the test frame, and the decoded frame after postprocessing reveals that there are 600 pixels between the reference pixels, then the scale is 2. Namely, 600 is divided by 300 indicating that there are twice as many display pixels as decoded pixels. Using this calculated scale, the video output analyzer 140 can transform or re-raster the postprocessed frame to produce the original decoded frame from the DUT 120.

Alternatively, a macroblock 340 having four subblocks in a checkerboard pattern is illustrated in FIG. 3. This checkerboard pattern can be used to detect the pixel locations more accurately, instead of using two white pixels or macroblocks. Furthermore, the checkerboard pattern allows for detecting both vertical and horizontal scaling. The checkerboard macroblock is made by coding alternate blocks white and black.

Proof of compliance is achieved when the absolute or root mean square (RMS) difference between the expected decoded frame from the reference video decoder 130 and the re-rastered and/or rescaled DUT's output frame is within the tolerances as specified by the MPEG standards and the IEEE standard for IDCT. However, in this situation, the difference must subtract any inaccuracies caused by the re-rastering or re-scaling of the decoded frames from the DUT 120. Namely, the video output analyzer 140 must account for the inaccuracies contributed by the postprocessing section 210.

The inaccuracies of the postprocessing section 210 may be different for different DUTs. As such, the inaccuracies must be measured at the time when the compliance test is being performed.

One illustrative method of measuring the inaccuracies is to apply the calculated scales (derived from re-rastering or re-scaling of the decoded frames from the DUT) to the decoded frames of the reference video decoder 130. This process mimics the postprocessing of 210, but instead, is applied to the decoded frames from the reference video decoder 130. Next, the re-rastering or re-scaling operations are immediately reversed to return the decoded frames from the reference video decoder 130 to their original state. In other words, apply postprocessing to the decoded frames from the reference video decoder 130 and then immediately apply the reverse postprocessing. Since the exact state of the decoded frames from the reference video decoder 130 is previously known, it is possible to compare the "de-postprocessed" frames with the "pre-postprocessed" frames, thereby measuring the distortion caused only by the postprocessing operation itself.

It should be noted that even if a DUT is deemed to be non-compliant based upon the criteria discussed above, there is a possibility that the non-compliant judgment is caused by the postprocessing section. As such, if the absolute or root mean square (RMS) difference between the expected decoded frame from the reference video decoder 130 and the re-rastered and/or rescaled DUT's output frame is within the tolerances as specified by the MPEG standards plus the measured inaccuracies caused by postprocessing section, then the DUT is deemed to be "possibly compliant".

Similarly, if the absolute or root mean square (RMS) difference between the expected decoded frame from the reference video decoder 130 and the re-rastered and/or rescaled DUT's output frame is not within the tolerances as specified by the MPEG standards plus the measured inaccuracies caused by postprocessing section, then the DUT is deemed to be "non-compliant". Namely, if the comparison of the two decoded frames is based on a new set of tolerances, which is the sum of the inaccuracies contributed by the postprocessing section and the restriction set by the MPEG and IEEE specs, and the DUT's output still does not pass, then non-compliance is proven.

Furthermore, it is important that the decoded frames be synchronized properly before differencing. Synchronization of the decoded frames is especially important when a DUT is a hardware device. Unlike a hardware DUT, the throughput delays of a software implemented DUT is generally known, since the output decoded frames are in the form of files. Any frame reordering, e.g., when B frames are present in the bitstream, must be accomplished similarly by both decoders 120 and 130.

Frames synchronization can be achieved by a number of methods, such as knowing the throughput delay of the DUT in advance and then waiting for a period of time equal to this delay before the first frame is captured. To synchronize pixels within a frame, the horizontal and vertical synchronization pulses are monitored at the output of a hardware MPEG video decoder IC to deduce the start of the first active pixel of the first active line.

Another method of frame and pixel synchronization involves the use of "key blocks" within test frames. These blocks are designed to contain, within a predefined region of a test frame, e.g., an intra-coded area, an image pattern which is easy to detect both in a digital bitstream and in a decoded video signal. Key blocks should also be highly compressible in the selected encoding scheme. The key block can be placed at the start of each test frame or only at the first test frame to be compared. Additionally, indexed key blocks can be used similarly to a product bar code to identify the frame under test. The key blocks used with a matched filter would also provide pixel synchronization signal. Key blocks are especially useful when the output frame display rate does not match the encoded frame rate as in the case of MPEG display on a 72 frame-per-second computer monitor.

Figure 4:
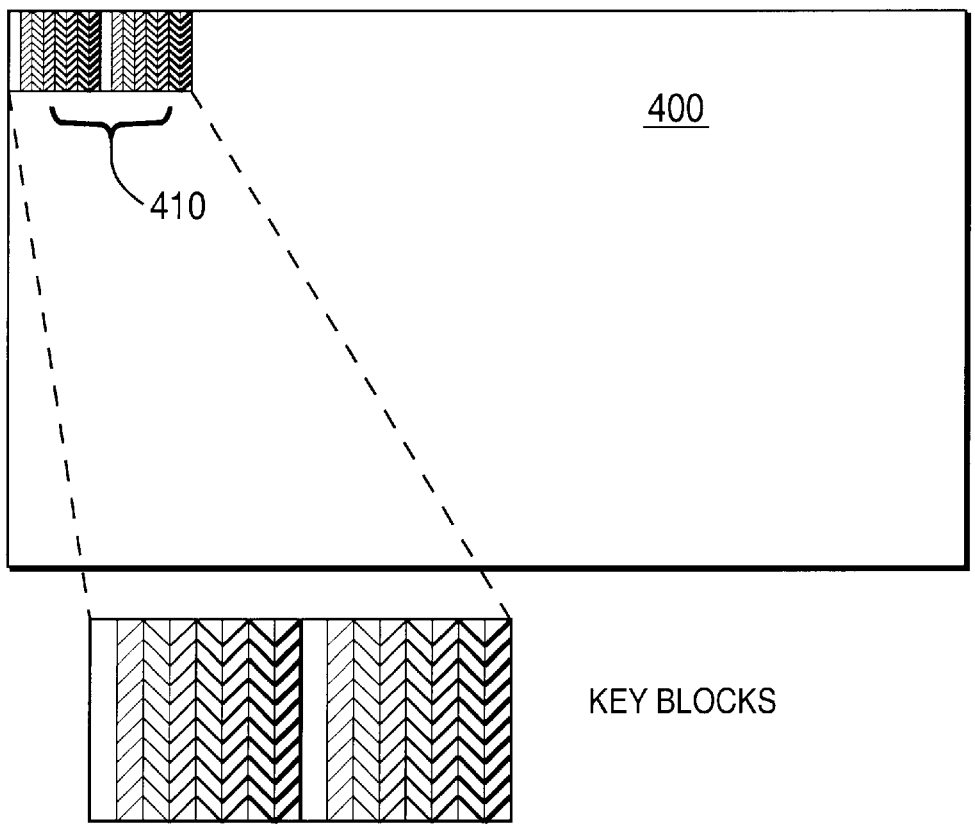
FIG. 4 depicts a test frame having key blocks.

FIG. 4 illustrates one example of a video test frame 400 containing key blocks 410. The first two blocks of the coded frame are set aside for keying. In the preferred embodiment, each block is an 8×8 block of pixels, e.g., one quarter of a MPEG macroblock, but it should be understood that other block sizes can be used. The DCT coefficients for these two blocks are all zero except for selected horizontal-only coefficients. These coefficients can be chosen to give an easily detected pattern in a captured frame or a component or composite video signal. For example, the key blocks 410 are illustrated with a pattern that starts with white and then gradually turns into black, i.e., each macroblock only contains a single frequency.

In fact, other forms of machine-readable numbers can be inserted in a row of intra-coded macroblocks with a binary encoded frame number. The number can move with panscan so as to ensure that it is always in the displayed area. Furthermore, a line other than the top or bottom line can be used to ensure that the synchronization pixels are "on screen" to avoid having the key blocks being clipped by the display process. Thus, the selective use of reference data, e.g., reference levels, patterned blocks or key blocks serves to assist the present invention in addressing the criticality of inaccuracies introduced by the postprocessing of a DUT.

It has been found that the IDCT process within a DUT often contributes a significant amount of errors in the decoding process. Furthermore, a compliance-only test may not reveal the extent of the non-compliance. As such, the present test bitstream is designed not only to assess the compliance of a DUT, but it is also designed to gain additional insight into the accuracy of the IDCT process of a DUT.

Typically, if the IDCT of the DUT is compliant, then all errors for all pixels in all frames should be less than or equal to 1 in magnitude. If an error is larger than this limit, it can be attributed to one or both of the following considerations.

First, when the IDCT of a DUT is non-compliant, i.e., its accuracy is outside the bounds set by the MPEG standards and other referenced documents, these types of errors are typically limited to isolated, singlepixel errors in the difference image. As an alternative embodiment, the present method measures the RMS error for the entire block and/or macroblock. This method can provide information about the DUT's IDCT process and its inaccuracies.

Second, some functions in the DUT is implemented incorrectly, e.g., the DUT is performing frame IDCT when it should be performing field IDCT. These are relatively large errors in the decoded video and may indicate functional implementation flaws. Typically, errors that are much larger than 1 in magnitude, and spread over large areas in the image (e.g., 16×16 pixels regions or larger), are indicative of functional implementation flaws.

Furthermore, the MPEG predictive coding methodology fosters dependency in the frames within the bitstream in exchange for compression efficiency. However, an undesirable side effect of such dependency is that IDCT errors can often accumulate over time. These IDCT errors affect the compliance testing process such that it can obscure the flaws of a non-compliant DUT. Such accumulation can be prevented and addressed using different methods.

First, the reference decoder 130 can be modified to use the anchor frames, e.g., I or P frames, from the DUT. By using the same anchor frames, the IDCT errors, if present, will typically accumulate in similar degrees in both decoders. Namely, by starting with the same IDCT errors and using the differencing operation as discussed above, the cumulative effect of the IDCT errors is removed. In this fashion, cumulative IDCT errors can be eliminated as a possible cause for non-compliance of a DUT.

Second, the reference video decoder 130 can be modified to use the same IDCT algorithm as the DUT. This method is especially appropriate if the DUT is a software decoder where the IDCT process is typically defined as a function that can be isolated and copied. This method is even more effective in eliminating cumulative IDCT errors than the above method, because the entire IDCT process is duplicated. IDCT errors will accumulate in both decoders in exactly the same manner, and such errors can be effectively removed by the differencing operation. In turn, the IDCT algorithm can be separately checked for compliance. For bitstreams that use the "predictive test" methodology, e.g., bitstreams that are designed such that decoding errors are propagated from frame to frame, only the last frame would have to be compared. A detailed discussion concerning a method of using only a subset of frames to perform compliance testing is provided below.

Third, a limit can be placed on the number of frames in each test bitstream (e.g., no more than two frames per test bitstream), thereby limiting the severity of any cumulative errors. This method is simple to implement without having to modify the reference video decoder 130.

Figures 5, 6:
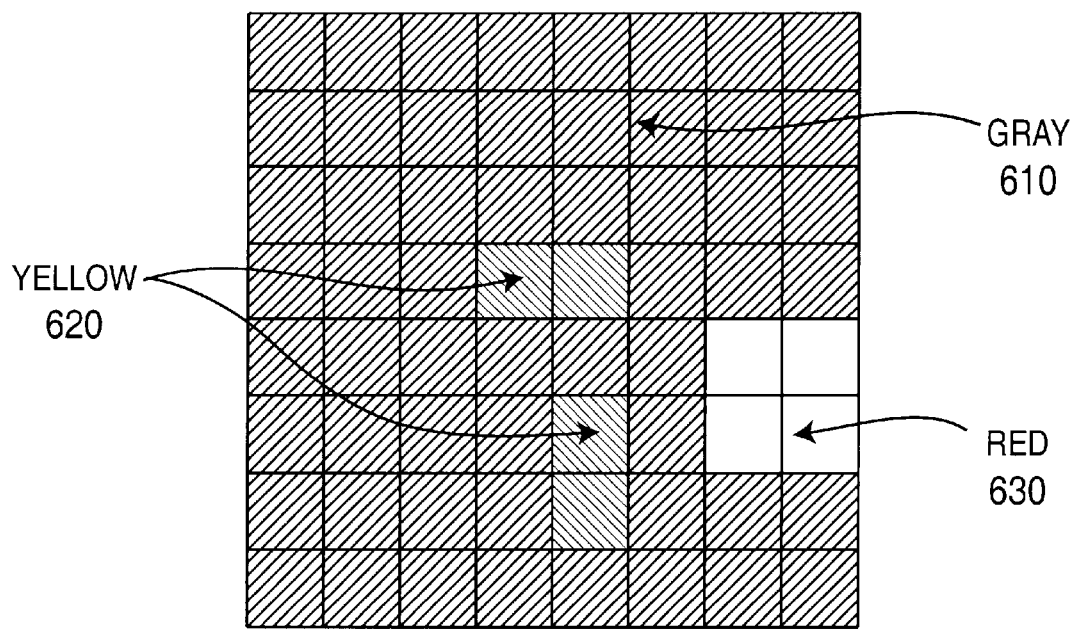
FIG. 5 depicts a numerical format for displaying errors detected by the video output analyzer.
FIG. 6 depicts a color format for displaying errors detected by the video output analyzer.

FIG. 5 and FIG. 6 illustrate two embodiments of displays for displaying the errors detected by the video output analyzer 140. These displays provide a summary report on the detected errors in an easily viewable format via display 150. On a pixel-by-pixel basis, the difference errors are computed. For example, a single 8×8 block of pixel differences is shown in a numerical format (FIG. 5) and in a color-coded format (FIG. 6).

FIG. 5 illustrates a 8×8 block 500 of pixel differences 510, 520 and 530. The zero (0) difference values 510 indicate that there are no difference between the DUT's output signal as compared to the reference video decoder's output signal at these pixel locations. The difference values 520 indicate that there are some differences between the DUT's output signal as compared to the reference video decoder's output signal, but the differences are within acceptable limits, e.g., not exceeding the absolute magnitude of 1 at these pixel locations. Finally, the difference values 530 indicate that there are significant differences between the DUT's output signal as compared to the reference video decoder's output signal, where the differences exceed acceptable limits. This type of representation is the finest representation of errors, since it is pixel based. It can be displayed as numbers by the video output analyzer 140 (or on a logic analyzer), or as an image on a video monitor 150.

To visually enhance the errors, FIG. 6 illustrates a 8×8 block 600 of pixel differences in a color display format. For example, zero errors can be displayed as gray 610, errors with magnitude of 1 or less can be displayed as yellow 620 (a warning, but still compliant), and errors greater than 1 can be displayed as red 630 (non-compliant). These images could be one form of the Y, Cr, Cb "results" as shown in FIG. 2.

Alternatively, the displaying methods can be expanded to the block and macroblock level. Namely, a numerical value or color (or shades of gray) can be selected to represent "no error", a "slight acceptable error" and "non-compliant error" for a block or macroblock.

Another alternative method of representing the "result" is to simply accumulate the number of errors in each frame, or over the entire sequence, that exceed 1 in magnitude. If any error exceeds 1 for any pixel in the decoded video sequence, the DUT is considered non-compliant. This type of result representation is less informative than the pixel-based result as described above, but it is simpler to implement.

However, the above pixel-by-pixel and frame-by-frame approach is computationally expensive and has a large storage requirement. To illustrate, if each test bitstreams has over 100 frames, and each decoded frame (at 720×480 images size, 4:2:0 chroma format) requires about 0.5 MB of storage space, then it is necessary to store over 50 MB of reference frames to perform each test.

A third embodiment of the present invention employs a method for analyzing the video output of MPEG-like video decoders using only a subset of frames in the bitstream. The advantage of this method is that only a subset of frames are stored and compared, thereby reducing storage requirements and computational overhead.

More specifically, this subset frame analysis takes advantage of the predictive nature of the encoded test bitstreams. MPEG compliant bitstreams typically employ motion estimation and motion compensation to remove redundancy that exists between the consecutive frames (or pictures) of a video image sequence. In brief, a current frame can be reconstructed from a reference frame and the difference between the current and reference frames by using the motion information (motion vectors). The reference frames can be a previous frame (P-frame), or previous and/or future frames (B-frames).

In one embodiment, the input test bitstream contains only a sequence of P frames following an I frame without any B frames. For such tests, only the last frame of the test or the last frame of a sequence of frames (a P frame) from both decoders 120 and 130 is evaluated and compared for compliance. For example, the DUT 120 is compliant if the peak error magnitude is not greater than 1 for the last P frame as compared to the last P frame of the reference decoder 130. This subset frame analysis is premised on the fact that errors that appear in earlier P frames are propagated down to the last P frame. As such, the DUT is compliant only if the decoder performed all the functions under test correctly, and where the IDCT mismatch is insignificant.

Furthermore, the subset frame analysis may provide additional insight into the DUT. To illustrate, if the last frame of the DUT is captured and compared, isolated single-pixel errors are most likely due to effect of accumulated IDCT mismatch (error), whereas large-area errors represent implementation flaws and therefore failure of the particular test.

However, for tests that may require B frames, the method may store a sequence of one or more reconstructed B frames, capture the corresponding frames from the DUT, and perform the error analysis on the captured B frame. B frames require special treatment because, unlike P frames, the B frames do not propagate errors forward in time. Namely, if an error occurred within a B frame, then only an analysis of that particular B frame will reveal the error.

For example, for a sequence of "I,P,P,P,P,P" frames, the subset analysis method may simply compare the last P frame to detect compliance of the DUT. For a sequence of "I,P,P,P,B,P,P,P" frames, the subset analysis method should compare the last P frame plus the B frame to ensure proper evaluation of the DUT for compliance.

FIG. 7 is a flowchart that illustrates the compliance testing method 700 of the present invention. The method starts in step 705 and proceeds to step 710, where the test bitstreams are decoded by both the DUT 120 and the reference decoder 130. As discussed above, the decoding process for the reference decoder 130 can be optionally implemented in advance, where the decoded frames are stored for retrieval at a later time.

In step 720, method 700 can optionally select a subset of the decoded frames for evaluation. The selected frames for comparison depend upon the type of the test frames, e.g., whether there are P and/or B frames within the test sequence as discussed above. If a subset of the frames is not selected, then the compliance testing is conducted for all decoded frames.

In step 730, method 700 queries whether the decoded frames have undergone postprocessing. If the query is negatively answered, then method 700 proceeds to step 735, where on a pixel-by-pixel and frame-by-frame basis, the Y, Cr and Cb matrices are differenced, and the magnitude of the error is computed. If the query at step 730 is affirmatively answered, then method 700 proceeds to step 740, where the postprocessing inaccuracies are computed.

In step 750, method 700 queries whether the difference result is within the MPEG limits minus the computed postprocessing inaccuracies. If the query is affirmatively answered, then method 700 proceeds to step 755, where the DUT is deemed to be compliant and the method ends in step 775. If the query is negatively answered, then method 700 proceeds to step 760.

In step 760, method 700 queries whether the difference result is within the MPEG limits plus the computed postprocessing inaccuracies. If the query is affirmatively answered, then method 700 proceeds to step 765, where the DUT is deemed to be possibly compliant and the method ends in step 775. If the query is negatively answered, then method 700 proceeds to step 770, where the DUT is deemed to be non-compliant. The method ends in step 775.

Although various embodiments which incorporate the teachings of the present invention have been shown and described in detail herein, those skilled in the art can readily devise many other varied embodiments that still incorporate these teachings.

What is claimed is:

1. A method of evaluating a decoder under test (DUT), comprising the steps of:
   (a) sending a test bitstream to the DUT, where said DUT generates a DUT output signal having one or more decoded test frames;
   (b) providing a reference output signal having one or more decoded test frames, wherein said reference output signal is generated by sending said test bitstream to a reference decoder; and
   (c) comparing, frame by frame, said DUT output signal and said reference output signal to evaluate the performance of the DUT.

2. The method of claim 1, wherein said providing step (b) comprises the step of sending said test bitstream to a reference decoder, where said reference decoder generates said reference output signal.

3. The method of claim 1, further comprising the step of:
   (a') computing a postprocessing inaccuracy of a postprocessing process associated with said DUT before comparing said DUT output signal and said reference output signal.

4. The method of claim 3, further comprising the step of:
   (b') selecting only a subset of said decoded test frames from said output signals for said comparing step (c).

5. The method of claim 4, wherein said test bitstream comprises at least a sequence of P frames, where said selected subset of frames comprises at least a last P frame from said sequence of P frames.

6. The method of claim 3, wherein each of said output signals comprises a luminance and chrominance signals, where said comparing step (c) comprises the step of differencing said luminance and said chrominance signals between said output signals on a pixel-by-pixel basis, to produce a difference error value for each of said pixels.

7. The method of claim 6, wherein said DUT is deemed to be compliant, if said difference error value minus said computed postprocessing inaccuracy is within a predefined acceptable limit.

8. The method of claim 6, wherein said DUT is deemed to be possibly compliant, if said difference error value is within a predefined acceptable limit plus said computed postprocessing inaccuracy.

9. The method of claim 3, further comprising the step of:
   (a'') incorporating at least one intra-coded area within at least one of said test frames.

10. The method of claim 9, where said intra-coded area contains one or more reference levels.

11. The method of claim 9, where said intra-coded area contains one or more key blocks.

12. The method of claim 1, further comprising the step of:
   (a') selecting only a subset of said decoded test frames from said output signals for said comparing step (c).

13. The method of claim 12, further comprising the step of:
   (a'') incorporating at least one intra-coded area within at least one of said test frames, where said intra-coded area contains one or more reference levels.

14. An apparatus for evaluating a decoder under test (OUT) by applying a test bitstream, said apparatus comprising:
   a reference source, for providing a reference output signal having one or more decoded reference test frames, wherein said reference output signal is generated by sending said test bitstream to a reference decoder, where the test bitstream is received by the DUT to generate a DUT output signal having one or more decoded DUT test frames; and
   an analyzer, coupled to said DUT and said reference source, for comparing, frame by frame, said DUT output signal and said reference output signal to evaluate the performance of the DUT.

15. The apparatus of claim 14, wherein said reference source comprises a reference decoder, for receiving the test bitstream to generate said reference output signal.

16. The apparatus of claim 14, wherein said analyzer computes a postprocessing inaccuracy of a postprocessing process associated with said DUT before comparing said output signals.

17. The apparatus of claim 14, wherein said analyzer selects only a subset of said decoded test frames from said output signals for comparison.

18. The apparatus of claim 14, wherein the test bitstream contains a plurality of test frames, where at least one intra-coded area is incorporated within at least one of said test frames.

* * * * *

UNITED STATES PATENT AND TRADEMARK OFFICE
CERTIFICATE OF CORRECTION

PATENT NO. : 6,400,400 B1 Page 1 of 1
DATED : June 4, 2002
INVENTOR(S) : Michael A. Isnardi, Charles B. Bieterish and Hans A. Baumgartner It is certified that error appears in the above-identified patent and that said Letters Patent is hereby corrected as shown below:

<u>Title page,</u>
Item [56], References Cited, U.S. PATENT DOCUMENTS, please change "Jenko" to -- Janko --.

Column 3, Line 29, starting with "as the latest" and continuing through to Column 4, Line 5, ending with "tions." should be deleted and inserted at Column 4, Lines 45, after "such".

Column 4, Line 5, starting with "a software" continuing through to Line 6 ending with "generator." should be moved to Column 3, Line 29 after "represented by".

<u>Column 5,</u>
Line 26, please insert "is" after "210".

<u>Column 8,</u>
Line 28, please replace "singlepixel" with -- single-pixel --.

<u>Column 12,</u>
Line 29, please replace "OUT" with -- DUT --.

Signed and Sealed this

Seventeenth Day of December, 2002

JAMES E. ROGAN
*Director of the United States Patent and Trademark Office*